Dec. 21, 1954  C. M. SHAPIRO  2,697,632
ADJUSTABLE WEATHER STRIP DEVICE FOR DOOR WINDOWS
Filed Feb. 9, 1953  2 Sheets-Sheet 1
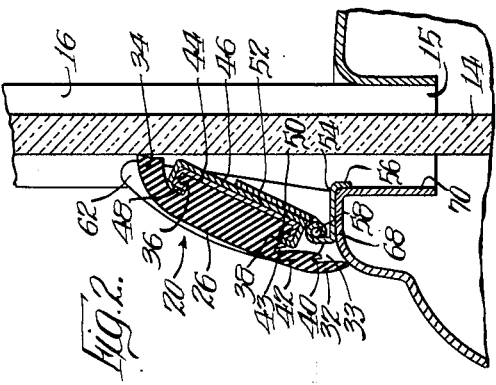
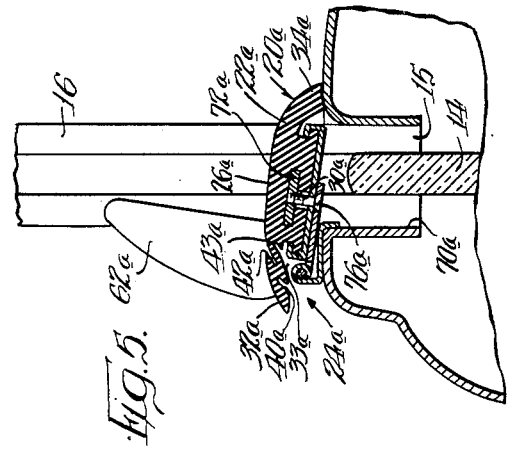
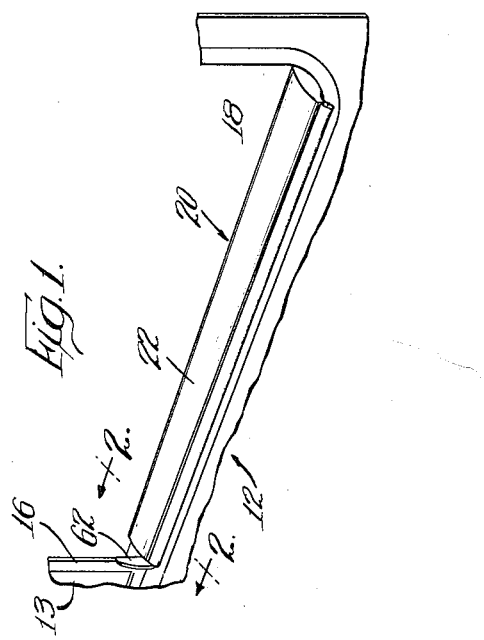
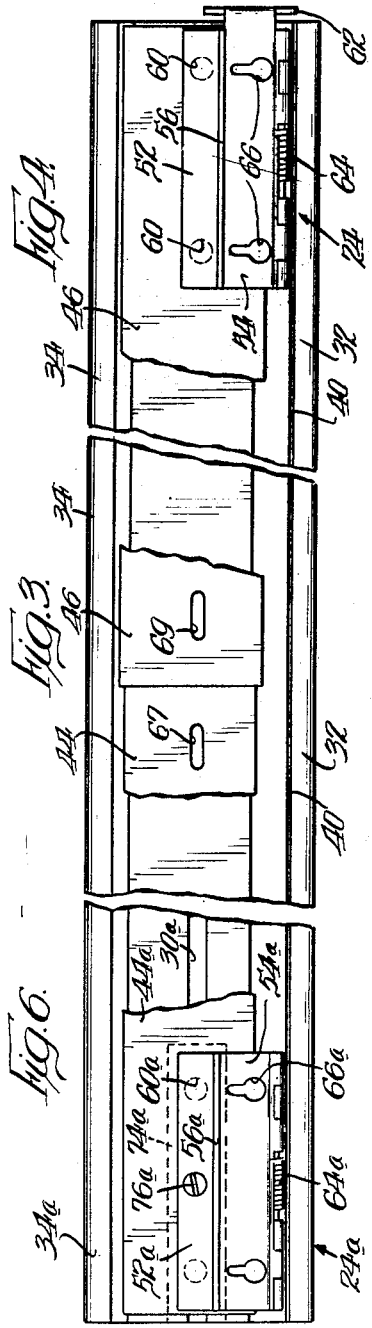
INVENTOR.
Clarence M. Shapiro
BY
Brown, Jackson, Boettcher & Dienner
Attys Dec. 21, 1954  C. M. SHAPIRO  2,697,632
ADJUSTABLE WEATHER STRIP DEVICE FOR DOOR WINDOWS
Filed Feb. 9, 1953  2 Sheets-Sheet 2
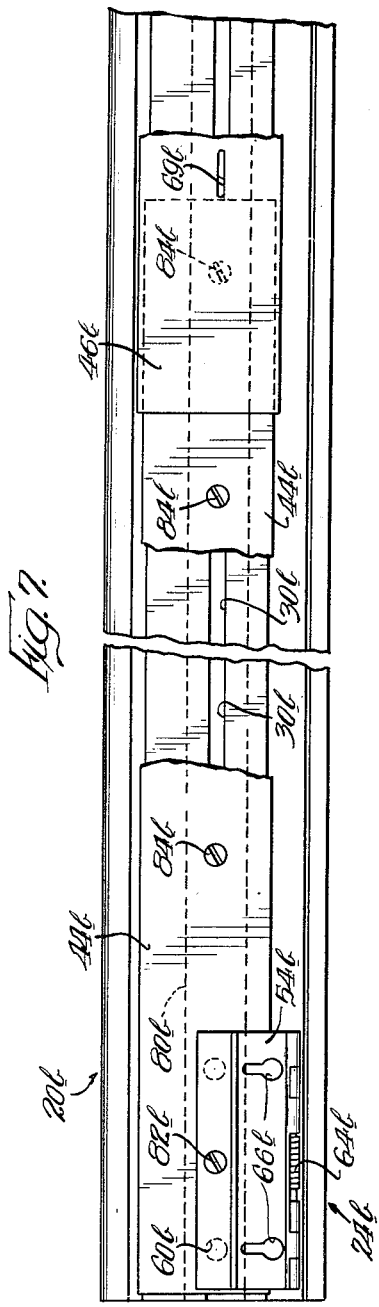
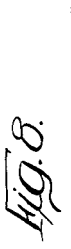
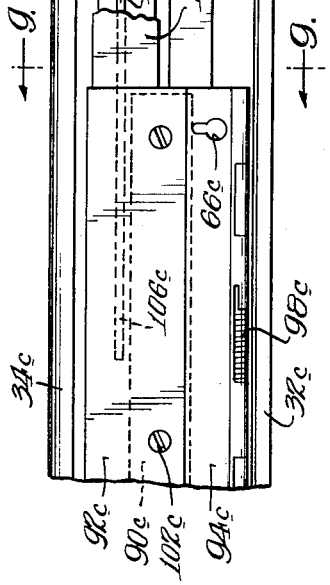
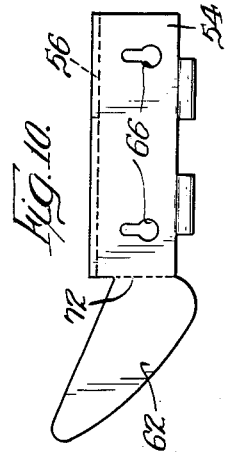
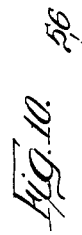
INVENTOR.
Clarence M. Shapiro
BY
Brown, Jackson, Boettcher & Dienner
Attys.

United States Patent Office 2,697,632
Patented Dec. 21, 1954

2,697,632

ADJUSTABLE WEATHER STRIP DEVICE FOR DOOR WINDOWS

Clarence M. Shapiro, Chicago, Ill.

Application February 9, 1953, Serial No. 335,949

15 Claims. (Cl. 296—49.2)

The present invention relates to an adjustable weather strip for door windows and is an improvement on the weather stripping of my copending applications, Serial No. 172,740, filed July 8, 1950, Serial No. 206,647, filed January 18, 1951, now Patent 2,633,380, and Serial No. 221,907, filed April 19, 1951.

Most automobile and truck doors have window glass which may be raised and lowered through a slot disposed in the lower part of the window frame portion of the door, the window glass when completely lowered lying inside of the door and generally having its top edge lying below, or flush with, the top of the slot or window well, and, when completely raised, generally having its side edges and top edge disposed within a groove which extends up the sides and across the top part of the window frame portion. Even when the window glass is held by its lower edge in a supporting structure, which will, when the window glass is completely raised, partially fill the slot or well to close it off to water, snow, dirt, etc., some water and dirt can get inside the door. This is especially true when the automobile is being washed. However, when the window is lowered, either partially or completely, rain, snow, dirt, and the like can get inside the door between the glass and frame very easily, with the result that the door may rust from the inside and the operating mechanism for the window glass and door latch may rust or become damaged by water and dirt working into it. As evidence of the fact that water does ordinarily get inside the doors, it will be noted that most doors have drain holes provided at the bottom to discharge such water.

In my prior applications, I have disclosed weather stripping pivotally mounted on the vehicle door adjacent the lower edge of the vertically reciprocable window. A resilient weather strip intimately engages the window when the window is elevated to provide a seal to prevent entry of water into the interior of the door. When the window is completely lowered, the weather strip is moved to a position overlying the slot or well in the door by means of a spring hinge construction, to serve the same purpose and also to serve as a cushion arm rest. The resilient weather strip also serves as a squeegee to clean the window glass. The present invention is directed generally to the same subject matter, but presents certain advantages over my prior applications.

My previous applications disclose that adjustability for different widths of door windows was provided by having a central metal reinforcing bar made in two or more parts with a hinge fastened to each part; the two or more bars together each having a length of less than the length of the rubber strip member.

It is an object of the present invention to provide an adjustable mounting for the weather strip wherein the mounting acts as a reinforcing means for the weather strip, but also is adjustable for different widths of vehicle door windows and yet securely grips the strip with a wedging action which makes it virtually impossible for the strip to be forceably removed from the mounting.

It is another object of this invention to provide an adjustable mounting means comprising telescoping channel members which securely but slidingly grip the weather strip member.

It is a further object of this invention to provide a spring biased hinge means for affixment to the said channel members and to a vehicle door or the like to provide for the ready securement of the invention.

Yet another object of this invention is to provide a number of alternative reinforcing means which may be used in addition to the reinforcement provided by the telescoping channel member, if so desired.

Other various advantages and objects of the invention will become apparent in the following detailed description of the preferred embodiments of the invention, wherein reference is made to the accompanying drawing, in which:

Figure 1 is a fragmentary perspective view of the left hand side door of a vehicle having the weather strip of the present invention secured thereto;

Figure 2 is an enlarged fragmentary cross-sectional view of a vehicle door, taken approximately on the line 2—2 of Figure 1, with the vertically reciprocable window raised.

Figure 3 is a fragmentary bottom view of the middle portion of the embodiment shown in Figures 1 and 2;

Figure 4 is a fragmentary bottom view of an end portion of the embodiment shown in Figures 1-3;

Figure 5 is an enlarged fragmentary cross-sectional view similar to Figure 2, with the exception that the vertically reciprocable window is lowered, showing a modification of the present invention;

Figure 6 is a fragmentary bottom view of one end portion of the embodiment shown in Figure 5;

Figure 7 is a fragmentary bottom view with portions broken away showing a further modification of the present invention;

Figure 8 is a fragmentary bottom view of yet another modification of the present invention, showing a stripping device mountable on the right hand door of a vehicle;

Figure 9 is a cross-sectional view along the line 9—9 in Figure 8; and

Figure 10 is a plan view of one of the hinge leaves of the present invention in which a guard, somewhat similar to a guard disclosed in my earlier applications, is made integral therewith.

In Figure 1, I have shown a door 12, which is the left and front door, of a vehicle. At the foreward edge of the door 12, a vent window 13 is pivoted on a vertical axis. Immediately to the rear of the window 13 is the window 14 which is vertically reciprocable in response to actuation by the driver of the vehicle through controls on the inner side of the door. The window 14 is mounted for reciprocation in a slot or window well 15 (see Figure 2). The window 14 is supported at its bottom edge in the usual manner and is supported at one side in a groove in the door frame portion 16 extending between the windows 13 and 14, at its other side in a groove in the rear margin 18 of the door, and at its top in a groove in the part of the door (not shown). Pivotally mounted on the door adjacent the window 14 is a weather stripping device generally indicated by the reference numeral 20.

The weather stripping device 20 generally comprises an elongate piece of resilient material 22, designated hereinafter as a weather strip, and a fastening means or pivotal support 24. The weather strip 22 is a unitary member including a relatively thick body portion 26 serving as a cushion or cushion rest for the arm of an occupant of the vehicle, a tail or overhanging edge portion 32 serving to shield the pivotal mounting of the strip 22 and a nose or squeegee edge portion 34 adapted for intimate engagement with the window glass 14. A recess 33 is provided in the body 26 of the strip between the body and the tail portion 32 to receive the hinge or pivotal mounting for the strip. If desired, the glass engaging edge or squeegee portion 34 of the weather strip may be provided with a glass engaging material of lesser coefficient of friction than rubber, such as felt, as shown in my earliest copending application.

The preferred embodiment of this invention is shown in Figures 1-4, wherein the body 26 is shown as formed with an elongated recess 36 adjacent the nose or squeegee edge 34 and a similar recess 38 adjacent the tail or overhanging portion 32 and spaced inwardly of recess 33; both of these recesses extend the full length of body 26. The body 26 is additionally formed with elongated grooves 40 and 42 which extend the full length of the inner and outer surfaces of overhanging portion 32, respectively, and immediate above recess 38 a similar third elongated groove 43 is formed. Slidably engaging the body 26 in recesses 36 and 38 and comprising part of fastening means 24 are inner and outer telescoping channel shaped members 44 and 46, preferably each of a length equal to approximately two-thirds the length of body 26; the inner channel member 44 is immediately adjacent the bottom surface of the body 26 for the full extent of the length of the channel while the outer channel member 46 is slidable on the outer surface of the inner channel member 44, thus being normally spaced from the bottom surface of body 26 throughout its length. The opposed edges or sides of the channel members are inturned toward each other as shown at 48 and 50. The size relationship between the parts is preferably such that when the inner channel member 44 is put in place on the body 26, the inturned edges 50 wedgingly hold the body 26 against the inner face of the channel member, and also the inner or opposing surfaces of inturned edges 50 wedgingly engage the portion of body 26 held therebetween. The outer channel member preferably resiliently, but slidingly engages the inner channel member, and the opposing surfaces of the inturned edges 48 wedgingly engage the portion of body 26 held therebetween. It is to be noted that the uppermost surface and the inwardly directed tip of each inturned edge 48 on outer channel 46 normally will tend to engage the upper surface and the uppermost half of the innermost surface of recesses 36 and 38 and the inwardly directed tip of each edge 50 on inner channel 44 will normally tend to engage the lower surface and the lowermost half of the innermost surface of the recesses 36 and 38; this is particularly true where the channel members overlap. It may be seen, therefore, that both the channel members securely retain the body 26 from removement therefrom, but permit relative sliding movement between the body and the channel members with respect to each other. Since the opposed edges 48, 48 and 50, 50 overlap the same length into grooves 36 and 38, a force directing the body outwardly with respect to the channels at points along body 26 where channel 46 does not engage channel 44, will bring the opposed edges 48, 48 of the outer channel into engagement with the lowermost surface of recesses 36 and 38, thus restraining removal of the body 26; edges 50, 50 will engage this surface throughout the remainer of the length of body 26 to effectively restrain an attempted removal of the strip 22 from the fastening means 24.

Fastening means 24 for the strip 22 of the preferred embodiment further comprises two hinges, preferably of the piano type, including a leaf or arm 52, a second leaf or arm 54 having a depending edge 56, and a pintle pin 58 pivotally connecting the leaves together. In the preferred embodiment of the invention the hinges are relatively short with respect to the body 26 and the two hinges are fixed to the respective channel members on opposite ends of the device 20; the end of the device 20 which is intended to be disposed at the front end of door 12, with respect to the forward motion of the vehicle, is shown in Figure 4. Leaf 52 of each hinge is spot welded to the respective channel members at 60, or, if so desired, suitable screw means may be employed to fix the leaf 52 of each hinge to the respective channel members. Preferably, made integral with the leaf 54 which is to be fixed on the forward end of the device 20, as shown in Figures 4 and 10, is a guard 62, similar to a guard disclosed in my earlier applications, the guard is utilized as hereinafter made clear. Coil springs 64 are mounted on the pintle pin 58 in the usual manner to urge the two leaves 52 and 54 of the hinge toward one another. Leaf 54 of each hinge is provided with key hole slots 66 for ready engagement with screws projecting upwardly from sill or reveal 68 of the door 12; such screws will fit into tapped holes (not shown) in the sill. As shown in Figure 3, slots 67 and 69 may be formed in the channel members 44 and 46, respectively, so that the end of a screw driver or the like may be inserted therein to aid in rapidly positioning the channel members.

In putting the preferred embodiment of my present invention into use, two sets of holes for the two hinges are drilled and tapped in the sill 68 a distance somewhat less than half the distance between surface 70 and the point where the center of the round portion of slots 66 of each hinge should be located when the hinge is fixed in place. The guard 62 integral with the forward hinge leaf 54 is bent upwardly with respect to the body 26 so that the rear or lee face of the guard 62 (with respect to the direction of usual motion of the vehicle) is adjacent to the leading or forward end of body 26. The necessary screws, having heads of a diameter somewhat larger than the width of the narrow portion of slots 66 but of a diameter less than the diameter of the round portion of said slots, are screwed loosely into the tapped holes. The channel members 44 and 46 are moved relative to each other so that the leaf 54 of each hinge may be brought into alignment with the screws; such movement may be facilitated by inserting the end of a screw driver or the like into slots 67 and/or 69 and pushing at the appropriate end of the slot. When the hinges are properly positioned, the leaf 54 of each hinge is brought into engagement with the screws and the screw heads are passed through the round portions of slots 66; each end of the device 20 is then moved outwardly from the door 12 until the depending edges of each leaf engage the wall 70. At this point the stem of each screw will be projecting through the narrow portions of slots 66 with the heads of the screws extending above and slightly over the upper surface of leaf 54. The screws are then tightened in place and the device 20 is positioned for use.

It is to be noted that when the device 20 is fixed in place the guard 62 is positioned to block off the space between the window 14 and the device 20 when the window is elevated; the guard is especially shaped to conform substantially to this space, as shown in Figure 2. This prevents entry of wind and moisture to the space due to the forward travel of the vehicle and overcomes any possibility of destruction or damage to the device or to the door. A plan view of guard 62 made integral with a leaf 54 is shown in Figure 10 wherein the guard 62 is to be bent perpendicular to the plane of leaf 54 approximately along the dotted line 72.

When the window 14 is in the lowered position, the device lies in a generally horizontal position and the tail portion of the body 26 overhangs the fastening means 24 with the outermost tip of the tail portion preferably closely adjacent the sill 68 and the nose 34 abuts the inside of the door 12; excess dirt, dust and moisture are thereby prevented from entering to interfere with the operation of the fastening means 24 or with the operation of the mechanisms inside the door 12. Groove 42 in the outside surface of tail 32 allows the tail to "droop" slightly over the fastening means, which aids in the protecting function; however, the groove 42 may also be utilized to position decorative trim (not shown) if so desired. Moreover, the body 26 provides a convenient cushion rest for the arm of the vehicle operator.

When the window 14 is raised, as the window moves upwardly it first contacts the outer channel member 46 and pivots the leaves 52 about the pintles 58. The nose 34 thereupon leaves the inside of the door 12 and rises upwardly, while the tail 32 moves downwardly into contact with the outside surface of door 12; as the position of Figure 2 is assumed the upper edge of window 14 slips laterally of the surface of the outer channel member 46 and comes into contact with the nose 34. The lower surface of the outer channel may be covered with a rubberized coating or the like (not shown) to protect the window surface, if so desired. As shown in Figure 2 the channel members are so positioned with respect to the nose 34 that the outer channel member 46 will not contact the window while the nose 34 is in contact therewith; the tail 32 has come into contact with the outer surface of the door 12 and forms a seal therewith. Grooves 40 and 43 give the tail 32 additional flexibility which allows it to form the generally concave curve shown in Figure 2 which provides an effective seal from wind and moisture present outside the door. Nose 34 resiliently presses against the window 14 to form a seal therewith in the manner described in my earlier applications, and in combination with the guard 62 and the tail 32 the interior of the door, as well as the fastening means 24, is completely protected from the elements. Upon lowering of the window, the device 20 assumes its generally horizontal position.

In Figures 5 and 6 a modified embodiment of the invention is shown, parts or portions thereof similar or identical to parts or portions of the embodiment described hereinbefore being indicated by the same reference characters with the suffix "a." In this embodiment additional reinforcing means for the body 26 is provided, besides that which is inherently afforded by the telescoping channel members. The device 20 hereinbefore described is similar in every respect to the device 20a shown in Figures 5 and 6, except that a longitudinal slot 28a is formed in body 26a, which communicates with a slot 30a; short reinforcing bars 72a and 74a are inserted at each end of the slot 28a. Preferably, each of the bars is of such a length that it will extend slightly beyond the end of the hinge on each end of the channel members, after the channel members have been positioned for attachment to a vehicle door window or the like, as shown in Figure 6. After the bars have been inserted at each end, the hinges, besides being spot welded to their respective channels, are fixed to the reinforcing bar disposed under them by a screw 76a passing through slot 30a. The utilization of these short reinforcing bars 72a and 74a aids in preventing the forceful ripping off of the resilient body 26 and is particularly useful where the body is of a softer type resilient material.

In Figure 7, I show a further embodiment of my invention, wherein parts or portions thereof similar or identical to parts or portions of the embodiments described hereinbefore are indicated by the same reference characters with the suffix "b." In this embodiment, the body 26b and the fastening means therefor are the same, but a single reinforcing bar 80b extends the full length of slot 28b in the body 26b; screws 82b, passing through connecting slot 30b fix the hinges to the ends of the reinforcing bar when the channels have been positioned for attachment to a window, the hinges also preferably being spot welded to the channels at 60b as earlier described. Screws 84b may be utilized to fix the inner channel 44b to the reinforcing bar at a plurality of points along the length of the device 20b if so desired. This embodiment provides for more complete reinforcement of the body 26b than the previously described embodiments and results in a singularly strong unitary device 20b. Alternatively, the bar 80b need only extend the length of the inner channel member 44b, if so desired, and the body 26b will be sufficiently reinforced.

Figures 8 and 9 disclose an embodiment in which the resilient body of the stripping device is similar to that disclosed with reference to the earlier disclosed embodiments, but the fastening means for the strip has been varied. In this embodiment, parts or portions thereof similar or identical to parts or portions of the embodiments described hereinbefore are indicated by the same reference characters with the suffix "c." A resilient body 26c is provided in which grooves 28c and 30c are formed and groove 28c receives the reinforcing bar 90c which extends from the front or leading end of the body to a point near the rear or trailing end of the body (it being understood that the front end of the body 26c is positioned at the front end of the vehicle window). Figure 8 shows the rear or trailing end of the device and as shown the reinforcing bar ends at a point a substantial distance from the end. As part of the fastening means a single channel member 92c is provided which is substantially the length of the bar and pivotally carries an elongated hinge leaf 94c along one of its edges. Leaf 94c is preferably the same length as the channel 92c, and is pivotally connected to one of its upstanding side portions by pin 96c; in so doing, alternative portions of the side portion and the leaf are turned about the pin 96c. A plurality of springs 98c are located at intervals along the length of the leaf 94c to bias the leaf toward the channel. The channel member 92c is put on the body 26c by inserting the angled side of the channel carrying the leaf 94c into elongated and rounded slot 38c and the other angled side, which carries the inturned edge 100c, into the slot 36c; it is preferred that the body 26c be resiliently held by the channel member between the two angled side portions thereof and also between each such side portion and the inner face of the channel member. The body 26c is slidably moved with respect to the channel 92c until the channel is aligned with the reinforcing bar 90c. Screws 102c, passing through grooves 30c, are utilized to secure the channel 92c to the reinforcing bar 90c. The device is normally fixed to the door of a vehicle by screws passing through the key-hole slots 66c in the leaf 94c into the car door sill. This arrangement tends to leave a portion adjacent the rear end of the body unsupported by any reinforcement. Since the longitudinal lengths of door windows vary, it is a simple matter to adjust this embodiment to the length of the door by merely cutting off part of the unsupported end portion resilient body. Where a portion of the unsupported body remains after the device has been put in place, I provide a supplementary channel 104c which has its opposite edges inturned and one inturned edge is slidable in slot 30c and the other in groove 36c. The supplementary channel cooperates with elongated pin 106c which is disposed between the bottom of the body 26 and the inside surface of the channels 92c and 104c, as shown in Figure 8; a slot 108c is provided in the body 26c for the pin 106c to be disposed in. The pin 106c provides a purchase whereby the relatively unsupported end is prevented from being bent inwardly or outwardly with respect to the door window and the inturned edges of the channel 104c are shaped to resiliently grip the body 26c to aid, in cooperation with the pin 106c, the other channel member 92c in retaining the body 26c in operative position.

The embodiment of Figures 8 and 9 operates in substantially the same manner as my previously disclosed embodiments and includes at the front end thereof the previously described guard (not shown) which may be made integral with the leaf 94c or made separately and attached thereto by any suitable means, such as by welding or by a screw.

It will be understood that the foregoing embodiments of the invention have been described as preferred embodiments, yet only exemplary of the invention defined by the appended claims. Variations in the structural details and the materials may be utilized without departing from the spirit and scope of the present invention. Therefore, I do not intend to be limited to the exact details of the preferred embodiments of the invention illustrated, except insofar as the appended claims are so limited, since various modifications and changes coming within the scope of my invention will be suggested to others by this disclosure.

I claim:
1. A weather stripping device for vehicle door windows comprising a resilient weather strip adapted to intimately engage the window and means for hingedly mounting said strip to the door adjacent the window, said means comprising channels having their opposed edges inturned toward each other for sliding engagement with said strip.

2. A new article of manufacture for use in conjunction with an automobile door window comprising a weather strip member of a length adapted to correspond to the length of the window slot in an automobile door and of a width greater than said slot and means for hingedly mounting said strip member to the door adjacent said window, said means comprising telescoping channels having their opposed edges inturned toward each other for sliding engagement with said strip member.

3. A weather stripping device for a vehicle door window comprising a resilient weather strip adapted to intimately engage the window and means for hingedly mounting said strip to the door adjacent the window, said means comprising telescoping channel members having their opposed edges inturned toward each other for sliding engagement with said strip, grooves in said strip for receiving said opposed edges and hinge means fixedly mounted on each channel member.

4. The device set forth in claim 3 wherein a slot is provided in the outer surface of at least one of said channel members to receive an actuator for sliding said one channel with respect to said strip.

5. The device set forth in claim 3 wherein said hinge means includes a pair of leaves adapted to be connected respectively to the door and to one of said channel members, the leaf for connection with the door having at least one key hole slot formed therein.

6. A weather stripping device for vehicle door windows comprising a resilient weather strip adapted to intimately engage the window and means for hingedly mounting said strip to the door adjacent the window, said means comprising telescoping channels having their opposed edges inturned toward each other for sliding engagement with said strip and hinge means fixedly mounted on each of said channels, said hinge means including a pair of leaves adapted to be connected respectively to the door and to one of said channels, and a guard secured to one of said hinge means in a position to normally prevent entry of wind and moisture to the space between said weather strip and the window as would normally be induced by movement of the vehicle.

7. A weather stripping device for vehicle door windows comprising a resilient weather strip adapted to intimately engage the window and means for hingedly mounting said strip to the door adjacent the window, said means comprising inner and outer telescoping channel members having their opposed edges inturned toward each other for sliding engagement with said strip, said strip provided with grooves for receiving said opposed edges, the arrangement being such that a portion of said weather strip is resiliently confined between said opposed inturned edges and the body portion of said inner channel member and said outer channel member resiliently engages said strip only at the tips of said inturned edges.

8. A weather stripping device for vehicle door windows of the type that are raised to a closed position and lowered into a well to an open position, comprising a resilient weather strip of a length substantially equal to that of the window and of a width in excess of the well, means for hingedly mounting said strip adjacent the window for urging the strip toward the window, said strip assuming a raised position engaging the window when the window is raised to provide a seal between itself and the window and a lowered position when the window is lowered into the well to cover the well and prevent entry of extraneous matter into the well, said means comprising telescoping channel members and hinge means fixed to each of said channel members, each of said hinge means comprising a pair of leaves and means biasing the leaves of each pair of leaves toward each other and a guard integral with one of the leaves of one of said hinge means in a position to normally prevent entry of wind and moisture to the space between said weather strip and the window as would normally be induced by movement of the vehicle.

9. The device set forth in claim 8 wherein said strip includes a flexible portion for providing a seal between the door and the strip when said strip assumes the raised position, said portion being grooved along the inner and outer surface thereof, the groove on said inside surface providing for increased flexibility of said portion and the groove on said outside surface being adapted to resiliently receive decorative trim.

10. A weather stripping device for a vehicle door window comprising a resilient weather strip adapted to intimately engage the window and means for hingedly mounting said strip to the door adjacent the window, said means comprising telescoping channel members having their opposed edges inturned toward each other for sliding engagement with said strip, grooves in said strip for receiving said opposed edges and hinge means fixedly mounted on said channel members, a reinforcing means extending longitudinally of said strip and receivable within a longitudinal slot in said strip, said hinge means being fixedly secured to said reinforcing means.

11. The device in claim 10 wherein said reinforcing means comprises a bar which extends the longitudinal length of said strip.

12. The device set forth in claim 10 wherein the reinforcing means comprises a short reinforcing bar at each end of said strip.

13. A weather stripping device for vehicle door windows comprising a resilient weather strip adapted to intimately engage the window, means for hingedly mounting said strip to the door adjacent the window, said means comprising channels engageable with said strip, said means including a supplementary channel member receivable on one end of said strip, a groove in said strip underlying an adjacent channel and said supplementary channel member and a pin receivable within said groove.

14. A weather stripping device for a vehicle door window comprising a resilient weather strip adapted to intimately engage the window and means for hingedly mounting said strip to the door adjacent the window, said means comprising telescoping channel members having their opposed edges inturned toward each other for sliding engagement with said strip, grooves in said strip for receiving said opposed edges and hinge means fixedly mounted on said channel members, said strip including an elongated slot extending longitudinally of said strip, a reinforcing bar receivable within said elongated slot, one of said telescoping channels being fixed to said bar.

15. In combination with a vehicle door having a window of the type that is raised to a closed position and lowered into a well to an open position, a weather stripping device comprising a weather strip of a length substantially equal to that of the window and of a width in excess of the well and a guard disposed with respect to said strip to prevent entry of wind and moisture to the space between said weather strip and the window as would normally be induced by movement of the vehicle, an improved fastening means for hingedly mounting said strip adjacent the window for urging the strip toward the window, said fastening means comprising telescoping channel members having their opposed edges inturned toward each other for sliding engagement with said strip and hinge means fixedly mounted to each of said telescoping channels, said hinge means including a pair of leaves adapted to be connected respectively to the door and to one of said channel members, and resilient means normally biasing the leaves of a pair of leaves toward each other, said guard being integrally connected to one of said hinge means.

References Cited in the file of this patent

UNITED STATES PATENTS

| Number | Name | Date |
|---|---|---|
| 991,140 | Davis | May 2, 1911 |
| 1,120,094 | Shipley | Dec. 8, 1914 |
| 2,568,811 | Larsen | Sept. 25, 1951 |